United States Patent [19]

DeTorre

[11] 4,096,773
[45] Jun. 27, 1978

[54] SELF-ALIGNING APPARATUS FOR SCORING FRACTURABLE MATERIAL

[75] Inventor: Robert P. DeTorre, Pittsburgh, Pa.

[73] Assignee: PPG Industries, Inc., Pittsburgh, Pa.

[21] Appl. No.: 725,222

[22] Filed: Sep. 22, 1976

[51] Int. Cl.² .............................................. B26D 3/08
[52] U.S. Cl. .............................................. 83/8; 83/11; 83/12
[58] Field of Search ............ 83/8, 11, 12, 10; 225/96, 96.5

[56] References Cited

U.S. PATENT DOCUMENTS

| | | | |
|---|---|---|---|
| 1,570,939 | 1/1926 | Cameron et al. | 83/12 |
| 1,646,918 | 10/1927 | Leuston | 83/12 |
| 3,055,247 | 9/1962 | Goble | 83/479 X |
| 3,140,629 | 7/1964 | Ingold | 83/11 |
| 3,198,044 | 8/1965 | Clin | 83/12 X |
| 3,280,676 | 10/1966 | Grzymislanwski | 83/12 X |
| 3,518,907 | 7/1970 | Pinel | 83/12 |
| 3,748,937 | 7/1973 | Long | 83/12 |
| 4,027,562 | 6/1977 | Bonaddio | 83/12 X |

Primary Examiner—Frank T. Yost
Attorney, Agent, or Firm—Donald Carl Lepiane

[57] ABSTRACT

An apparatus for scoring a glass sheet includes a scoring wheel rotatably mounted to one end of a shaft mounted in a rod end ball joint and a spring acting on the other end of the shaft to urge the wheel toward a sheet movement path under a predetermined force. The glass sheet is advanced along the path under the scoring wheel to urge the scoring wheel against the biasing action of the spring. The axis of the scoring wheel is aligned in a plane normal and transverse to the movement path by the motion of the glass sheet as it advances under the scoring wheel.

16 Claims, 10 Drawing Figures

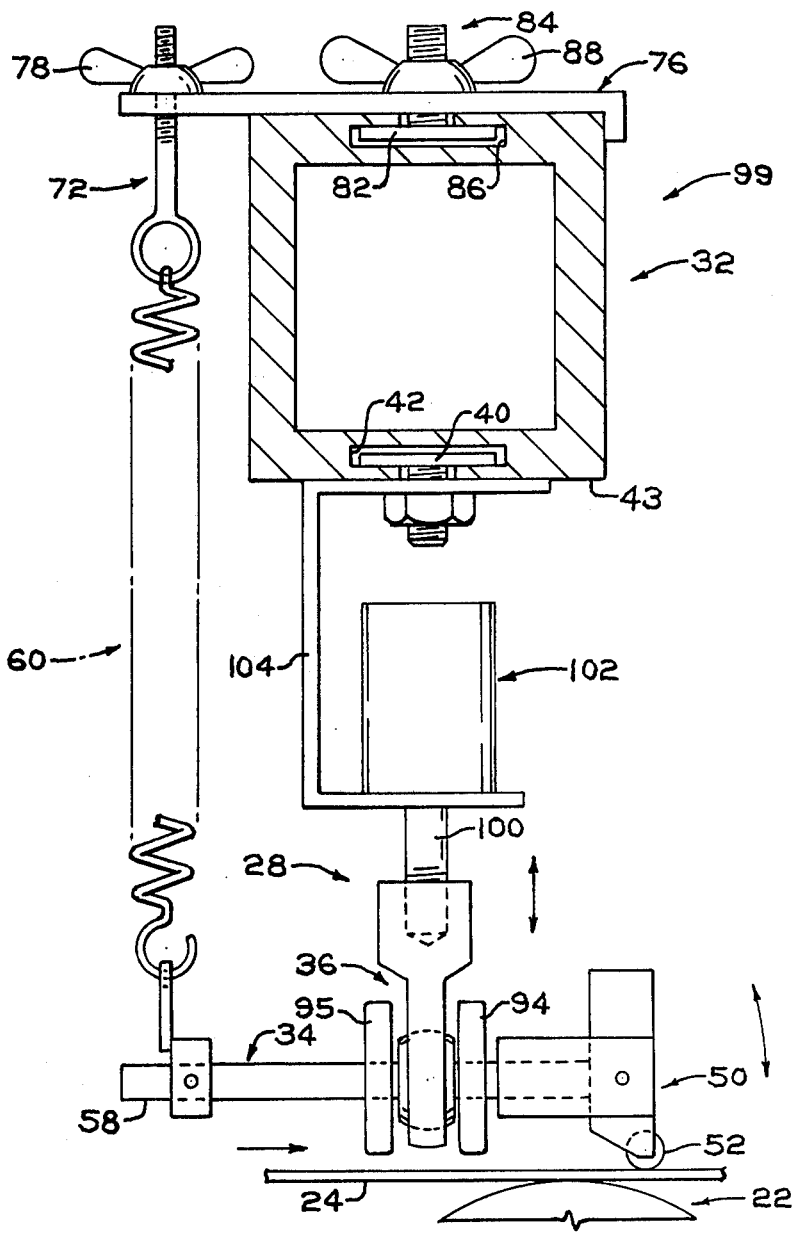
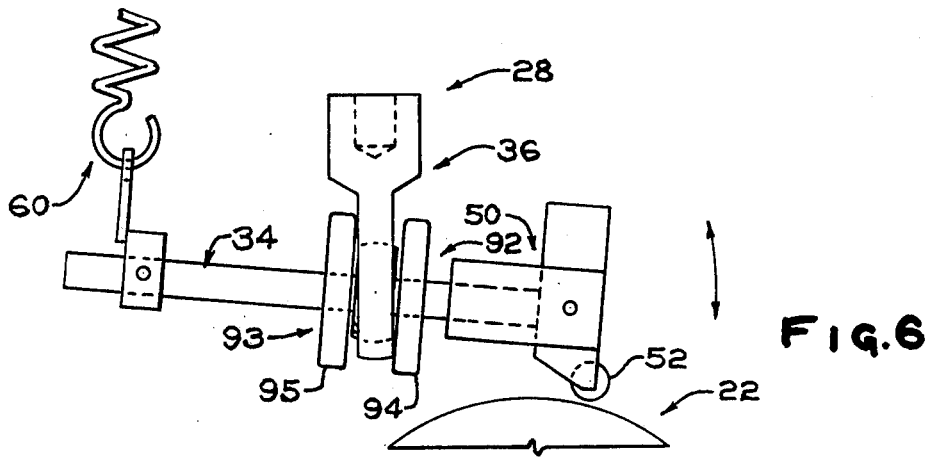

SELF-ALIGNING APPARATUS FOR SCORING FRACTURABLE MATERIAL

BACKGROUND OF THE INVENTION

1. Field of the Invention

This invention relates to an apparatus for scoring fracturable material, e.g., glass, and more particularly to a self-aligning scoring wheel.

2. Description of the Prior Art

There are various types of apparatuses for scoring fracturable material, e.g., glass, known in the prior art. In general, the scoring apparatuses include a scoring wheel rotatably mounted on a stem. The stem is mounted in a cylinder for vertical and rotational movement. A force is applied to the scoring wheel by way of the stem to urge the wheel against the glass to score same.

The stem is freely rotatable in the cylinder to align the rotating axis of the scoring wheel in a plane normal and transverse to the score path. The alignment of the score wheel is by the glass as it moves relative to the scoring wheel. In this manner, chipping of the glass is prevented as the score is imposed in the glass sheet. If the glass is chipped along the score line, the cut edge of the glass is damaged.

This damage reduces the edge strength of the cut edge and is normally removed by grinding or seaming to increase the edge strength.

A drawback of the prior art devices is that the stem tends to tilt in the cylinder thereby reducing the rotational motion of the stem.

It would be advantageous, therefore, if a scoring apparatus was available that did not have the limitations of the prior art.

SUMMARY OF THE INVENTION

This invention relates to an apparatus for scoring a fracturable material, e.g., glass. The scoring apparatus includes an elongated member having a first section and a second section. Joint facilities mount the member between the first and second sections to freely pivot the member in a first reciprocating arcuate path and in a second reciprocating arcuate path generally normal to the first reciprocating path. Scoring facilities are mounted on the first section of the member and biasing facilities act on the elongated member to urge the scoring facilities in a first direction along the first reciprocating arcuate path.

This invention also relates to a method for scoring a sheet of fracturable material. Scoring facilities are pivotally mounted about a point under a predetermined pressure to urge the scoring facilities against the sheet. The sheet and scoring facilities are displaced relative to one another while the scoring facilities is pivoted about the point to align the scoring facilities with the sheet to score same.

BRIEF DESCRIPTION OF THE DRAWING

FIG. 6 is a fragmented view of the scoring device shown in FIG. 3 illustrating the scoring device in the non-engaging position;

FIG. 7 is a view similar to FIG. 3 showing an alternate embodiment of the scoring device of the instant invention;

DESCRIPTION OF THE INVENTION

Figure 1:
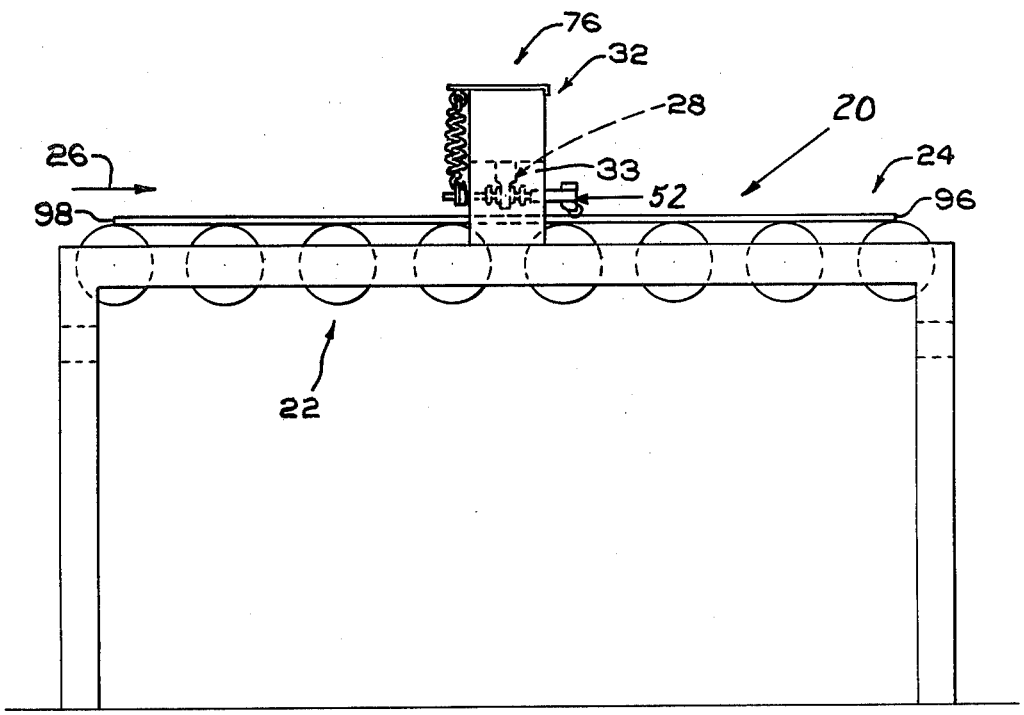
FIG. 1 is an elevated side view of a scoring station incorporating features of the invention.
Figure 2:
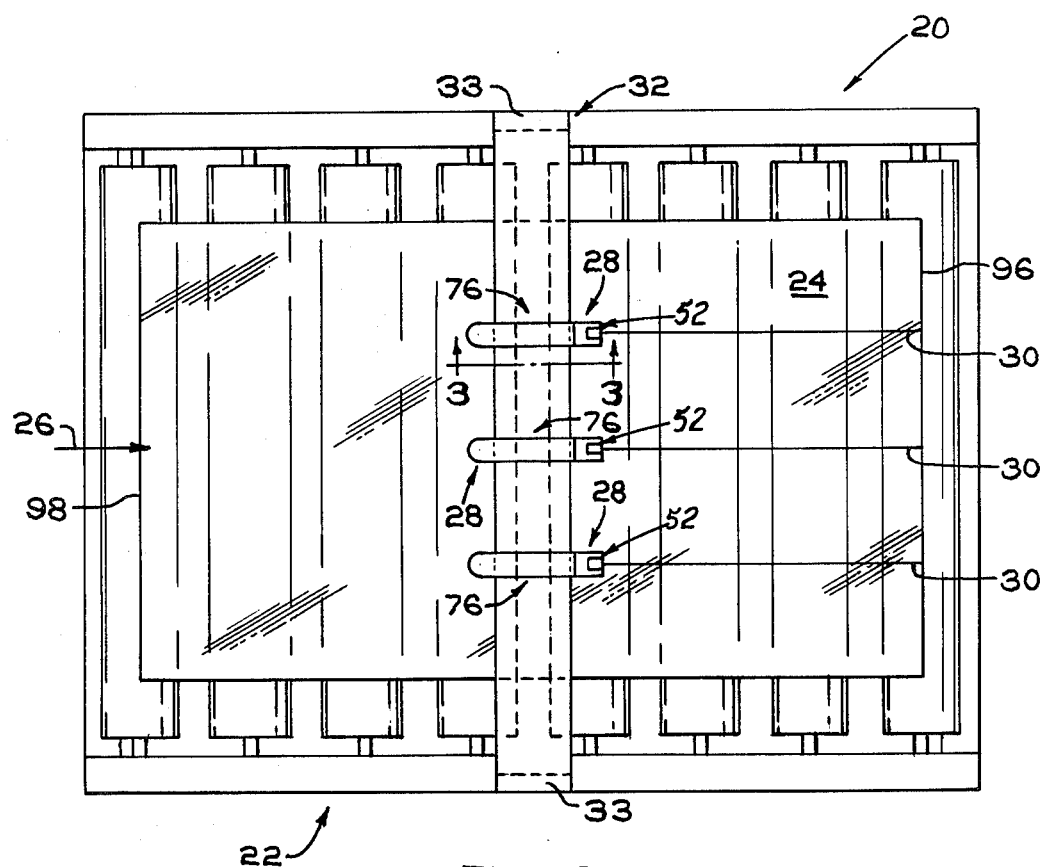
FIG. 2 is a top view of the scoring station of FIG. 1.

Shown in FIGS. 1 and 2 is a scoring station 20 having a roll conveyor 22 for advancing a sheet of fracturable material 24 along an article movement path designated by the arrow 26 past a plurality of scoring devices 28 incorporating features of the invention. The sheet 24 as it advances past the scoring devices 28 is scored to induce fissures or score lines 30 in the sheet 24.

As will become apparent, the invention is not limited to the type of conveyor used to advance the sheet 24 along the movement path 26. Any of the types of conveying facilities known in the art may be used in the practice of the invention. Further, the invention is not limited to the type of fissure or score line 30 imposed in the sheet 24. Any of the types known in the art may be used in the practice of the invention, for example, but not limited to, pseudosubsurface scoring taught in U.S. Pat. No. 3,865,673 and subsurface scoring taught in U.S. Pat. No. 3,865,294. The teachings of the above-identified patents are hereby incorporated by reference.

In the following discussion, the sheet 24 of fracturable material is glass. However, as will be appreciated, sheets of other fracturable materials may be used. For example, but not limited to refractories such as (1) ceramics, e.g., MONOFRAX ® ceramics sold by the Carborundum Corporation and (2) glass-ceramics, e.g., HERCUVIT ® glass ceramics sold by PPG Industries, Inc. and plastics.

Although not shown in FIGS. 1 and 2 and not limiting to the invention, a conveyor may be provided for advancing the sheet 24 into the scoring station 20 and for moving the scored sheets to a snapping position. At the snapping position, the score lines are opened to sever the sheet. The score lines may be opened in any conventional manner, e.g., as taught in the above-mentioned patents.

The scoring devices 28 are identical in construction and are mounted in predetermined spaced relationship on a bridge 32 in a manner to be discussed below. The bridge 32 is advantageously mounted above and transverse to the article movement path 26 by structural member 33 secured to the conveyor 22.

Figure 3:
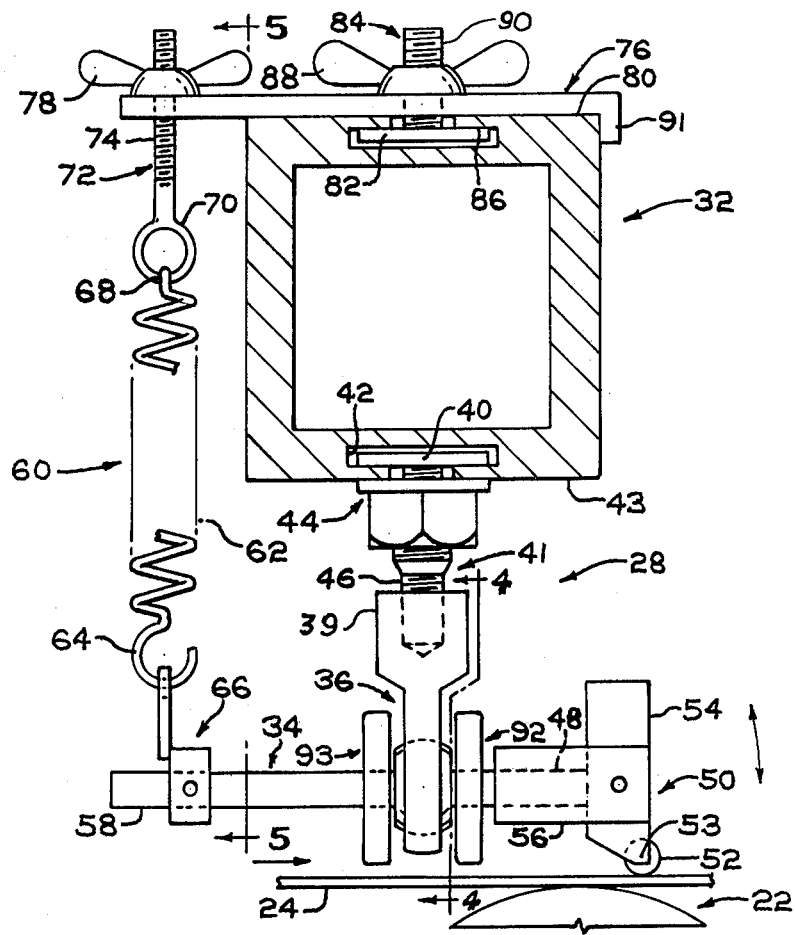
FIG. 3 is a view taken along lines 3—3 of FIG. 1 showing the scoring apparatus of the instant invention scoring a glass sheet.
Figure 4:
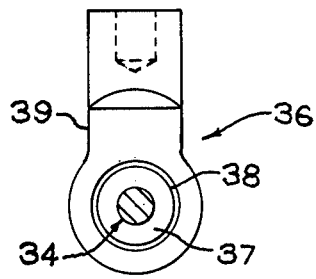
FIG. 4 is a cross-sectional view taken along lines 4—4 of FIG. 3.

With reference to FIG. 3, each of the scoring devices 28 includes an elongated member or shaft 34 secured in a rod end ball joint 36 (see also FIG. 4) in any conventional manner for universally pivoting the elongated member 34. With reference to FIG. 4, the joint 36 includes a ball bearing 37 mounted in a circular raceway 38 secured in yoke 39.

The joint 36 preferably used in the practice of the invention pivots the elongated member along a vertical reciprocating arcuate path and along a horizontal reciprocating path relative to the glass sheet 24 shown in FIG. 3.

The joint 36 is secured to the bridge 32 in any conventional manner. For example and as shown in FIG. 3, flat head 40 of bolt 41 is captured in a T-shaped groove 42 formed in the lower surface 43 of the bridge 32. The bolt 41 is held in position by nut and lock washer assembly 44. The shaft side of the yoke 39 is advantageously threaded onto the shaft 46 of the bolt 40.

Mounted on end 48 of the shaft 34 in any conventional manner is the scoring wheel assembly 50 of the type used in the art. The scoring wheel assembly 50 includes a scoring wheel 52 rotatably mounted about an axis 53 in a stem 54. The stem 54 is secured to the end 48 of the shaft in any conventional manner, e.g., by welding or by yoke member 56 such that a portion of the scoring wheel 52 or the scoring wheel 52 extends below the shaft 34 as shown in FIG. 3. The other end 58 of the shaft 34 is connected to a biasing assembly 60 to bias the scoring wheel assembly 50 in a downward direction as viewed in FIG. 3.

Figure 5:
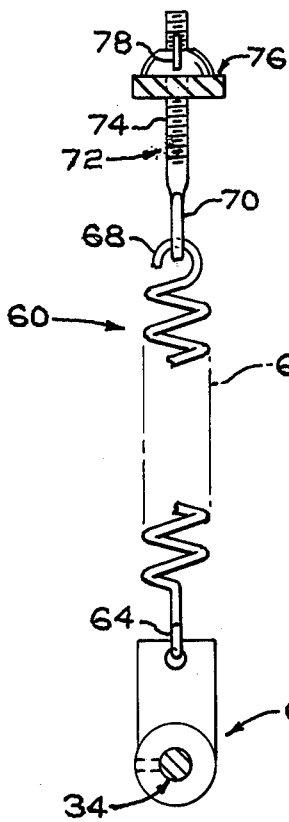
FIG. 5 is a view taken along lines 5—5 of FIG. 3.

With reference to FIGS. 3 and 5, the biasing assembly 60 includes a helical spring 62 having end 64 secured to collar assembly 66 mounted adjacent the shaft end 58. The other end 68 of the spring 62 is mounted in eye 70 of eye bolt 72. Threaded end 74 of the eye bolt 72 passes through a plate 76 to receive a wing nut 78 as shown in FIGS. 3 and 5.

The plate 76 is secured to the upper surface 80 of the bridge 32 in any conventional manner. For example, flat head 82 of bolt 84 is mounted in an inverted T-shaped groove 86 formed in the upper surface 80 of the bridge 32. The plate 76 is held against the upper bridge surface 80 by a wing nut 88 threaded on shaft portion 90 of the bolt 84.

To prevent rotational motion of the plate 76, it is preferably provided with a leg 91 engaging side portion of the bridge 32 as shown in FIG. 3.

The biasing assembly 60 applies a biasing force on the shaft 34 to urge the scoring head assembly 50 toward the conveyor 22. The force of the spring is translated into a scoring force. In the instant where the joint 36 is a rod end ball joint, the biasing assembly 60 maintains the scoring assembly 50 in the upright position such that the scoring surface of the scoring wheel 52 is perpendicular to the surface of the glass piece 24.

The tension of the spring 62, or stated another way, the scoring force applied to the scoring head 50 for a given spring may be varied by decreasing or increasing the distance between the plate 76 and the end 68 of the spring 62. This is accomplished by rotating the wing nut 78 in a first direction to increase the distance and in a second opposite direction to decrease the distance between the plate 76 and the spring end 68.

The force acting on the scoring assembly 50 has lever arm force vectors. Therefore, the scoring force acting on the scoring assembly 50 is equal to the distance between pivot point of the joint 36 and the collar assembly 66 times the force applied to the shaft by the spring assembly 60 divided by the distance between the scoring wheel 52 and the pivot point of the joint 36. For purposes of the instant invention, the distance between (1) the collar assembly 66 and (2) the pivot point of the joint 36 and the distance between (1) the scoring wheel 52 and (2) the pivot point of the joint 36 are set. Therefore varying the spring assembly 60 varies the scoring force acting on the scoring wheel 52.

Although not limiting to the invention but recommended to limit the pivotal motion of the scoring assembly 50 in the vertical direction as viewed in FIG. 3, a pair of stop collars 92 and 93 are mounted on the shaft 34 about the joint 36 to limit downward motion of the scoring assembly 50. More particularly and with reference to FIG. 6, as the scoring assembly 50 is moved in the downward direction as viewed in FIG. 6, the collar 92 engages the bottom portion of the joint 36 and the collar 93 engages the upper portion on an opposed side of the joint 36 as shown in FIG. 6. The scoring assembly 28 in FIG. 6 is shown in its non-scoring or initial position.

Referring now to FIG. 1, as the leading edge 96 of the sheet 24 moves under the scoring wheel assembly 50, the scoring assembly is urged upward as viewed in FIGS. 3 and 6 by the glass sheet against the biasing action of the biasing assembly 60. The scoring force is applied to the scoring assembly 50 by the biasing assembly 60 in the manner previously discussed. As the trailing edge 98 of the glass sheet moves past the scoring wheel 52, the scoring device 28 moves back to its initial position as shown in FIG. 6.

Although not limiting to the invention but recommended to prevent flexing of the glass during scoring, the scoring wheel 52 is preferably mounted over a rigid member, for example, the roll of the conveyor as shown in FIGS. 3 and 6.

The scoring force applied to the scoring wheel is normally determined when the scoring assembly 50 is in the engaging position. However, it is recommended that the upward motion of the scoring assembly 50 by the sheet 24 be at a minimum so that the force of the spring acting on the scoring assembly does not appreciably change. In this manner, the scoring force may be adjusted when the scoring assembly is in the initial position. The force of the spring acting on the scoring wheel may be determined in any conventional manner.

The scoring device 28 of the instant invention eliminates the drawbacks of the scoring device of the prior art. In the prior art, the scoring wheel is mounted on a stem mounted in a cylinder for vertical reciprocal movement and rotational movement. The glass during scoring tilts the stem in the cylinder limiting rotational movement of the stem. When this occurs, the score wheel may not be properly aligned and the glass is chipped during scoring.

By practicing the instant invention, the shaft 34 is mounted in the rod end ball joint 36 to provide free movement along a vertical reciprocating arcuate path and a horizontal reciprocating arcuate path.

Certain scoring techniques require heavy loads to be applied to the scoring wheel, for example, but not limiting thereto, the scoring techniques taught in U.S. Pat. Nos. 3,865,294 and 3,865,673. The scoring techniques taught in the above-mentioned patents require scoring pressures in excess of about 200 pounds per square inch (psi) [3 kilograms per square centimeter]. This requires that the spring 60 selected have sufficient biasing action to impose a force in excess of about 200 psi (3 kilograms per square centimeter) on the scoring wheel. When this amount of pressure is applied to the scoring wheel, the leading edge of the glass sheet engaging the scoring assembly 50 to raise same encounters resisting force of the biasing action of the spring assembly. This resisting force may damage the edge of the glass and cause scuff marks on the sheet by the rolls of the conveyor. To prevent this from occurring, scoring device 99 shown in FIG. 7 is recommended.

The scoring device 99 shown in FIG. 7 includes the spring assembly 60 attached to the shaft 34 and plate 76. The shaft 34 is secured in the joint 36 and the scoring assembly 50 secured to the shaft 34 as previously discussed for FIGS. 3 and 6.

In place of the joint 36 being attached to lower surface of the bridge 32, it is mounted in piston 100 of an air cylinder 102. The air cylinder 102 is mounted on a C-shaped channel member 104 secured to the bottom surface 43 of the bridge 32 in a similar manner as the joint 36 was mounted to the lower surface 43 of the bridge 32 as shown in FIG. 3.

The scoring device 99 in its initial position is preferably raised above the conveyor a sufficient distance to permit the glass to pass beneath the scoring wheel 52. When the leading edge of the glass is aligned with the scoring wheel 52 of the scoring assembly 50, the cylinder 102 is actuated in any conventional manner to move the joint 36 in a downward direction as viewed in FIG. 7 to urge the scoring wheel 52 into engagement with the glass. Continued downward movement of the piston 100 increases the biasing action of the spring assembly 60 on the scoring assembly 50.

After the trailing edge of the glass sheet moves past the scoring wheel, the piston 100 is retracted to its initial position until the next glass sheet is to be scored.

Figure 8:
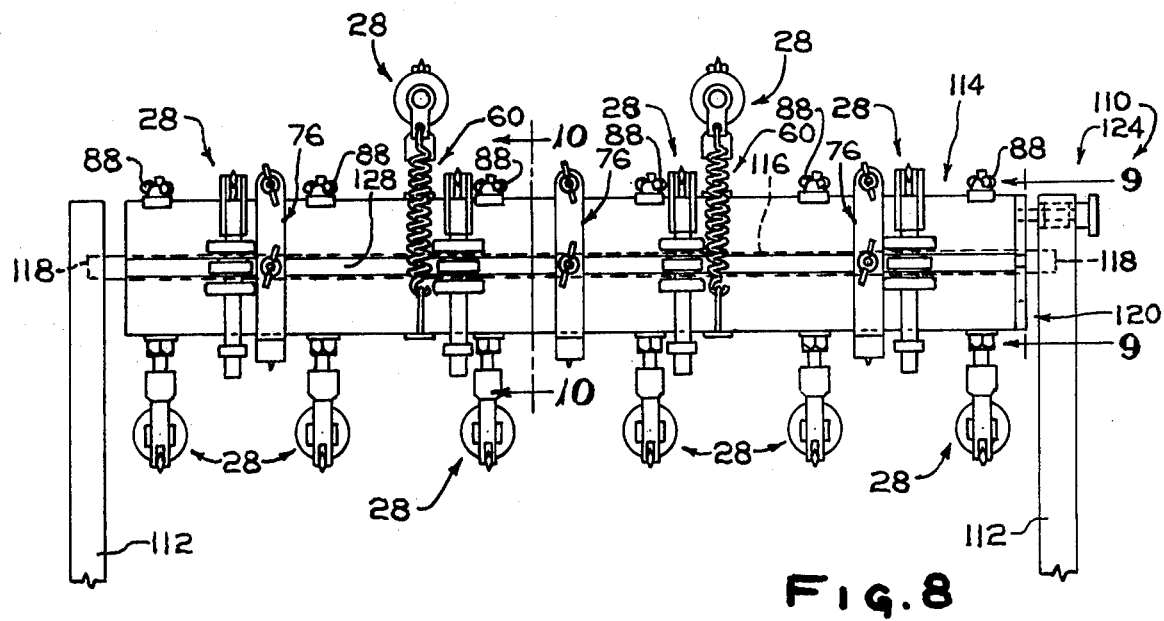
FIG. 8 is an elevated front view of a scoring bridge incorporating features of the invention.
Figure 9:
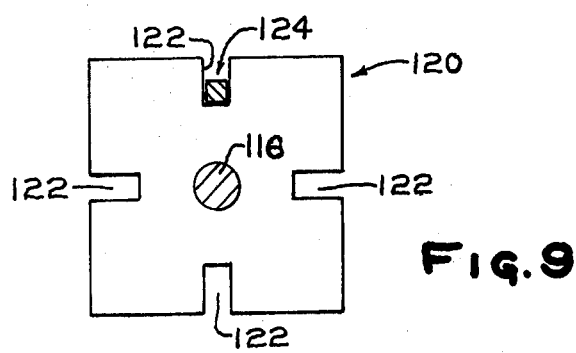
FIG. 9 is a view taken along lines 9—9 of FIG. 8.
Figure 10:
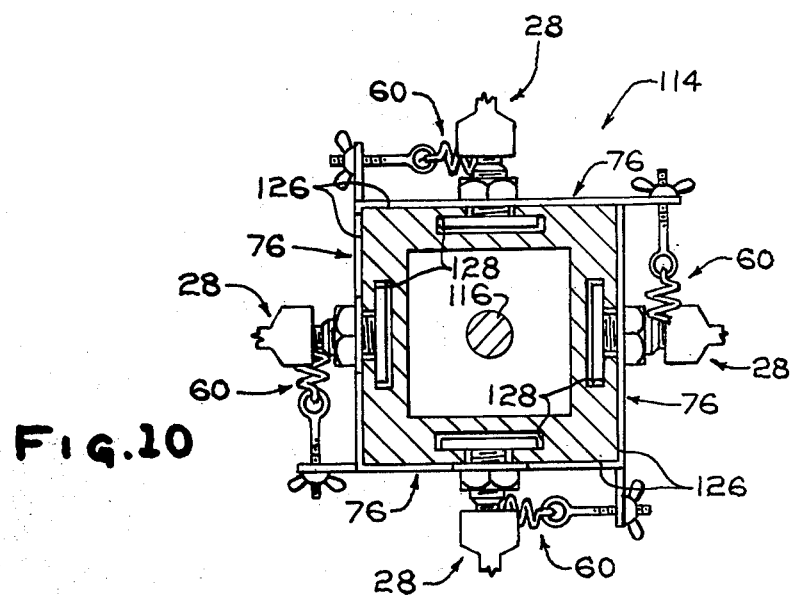
FIG. 10 is a view taken along lines 10—10 of FIG. 8.

Referring now to FIGS. 8-10, there is shown a bridge assembly 110 constructed in accordance to the teachings of the invention. The bridge assembly is mounted over the conveyor 22 of FIGS. 1 and 2 (not shown in FIGS. 8-10) by structural members 112 in a similar manner as bridge 32 shown in FIGS. 1 and 2.

The bridge 110 includes an elongated hollow rectangular cross-sectional member 114 having a rod 116 passing therethrough. Ends 118 of the rod 116 extend beyond adjacent ends of the member 114 and are rotatably mounted in structural members 112.

The member 114 is secured to the rod 116 so that rotating the rod 116 rotates the member 114.

A rectangular plate 120 is secured on the rod 116 between the rod end 118 and adjacent side of the member 114 as shown in FIG. 8. The plate 120 is provided with a notch 122 on each side corresponding to a side of the member 114.

A spring biased pin assembly 124 is mounted on adjacent structural member 112 to secure the member 114 in position.

With specific reference to FIG. 10, each side 126 is provided with the T-shaped groove 128. In this manner, a scoring device 28 or 99 is provided on each side of the member 114.

The advantage of this type of scoring bridge is that a scoring program can be arranged on each side of the member 114. For example, one scoring device 28 or 99 may be mounted on one surface of the member; two scoring devices mounted on the second surface of the member; three scoring devices mounted on a third surface of the member; and four scoring devices mounted on the fourth surface of the member.

The member 114 is rotated to move the desired numbers of scoring devices in facing relationship to the glass by pulling the pin out of the groove. The member 114 is rotated to position the scoring heads over the glass and the pin released to move in the facing groove 122. The member 114 is now secured in position.

As can now be appreciated, the invention is not limited to the above discussion and modification may be made within the scope of the teachings.

DETAILED DESCRIPTION OF THE INVENTION

The invention will be described to score glass sheets having a thickness of about ¼ inch (0.64 centimeter) and about ½ inch (1.27 centimeters). With reference to FIGS. 1 and 2, a roll conveyor 22 is provided for advancing a glass sheet 24 along an article movement path designated by the arrow 26. As the glass sheet advances along the path 26, it moves past scoring devices 28 or 99 mounted on the bridge 32. The bridge 32 is mounted above the article movement path and transverse thereto on structural members 33. The conveyor 22 has sufficient width and length to convey glass sheets having a length of about 3 feet (0.9 meter) and a width of about 6 feet (1.8 meters) past the bridge 32 for scoring the sheets.

With reference to FIG. 2, three scoring devices are mounted on the bridge 32 spaced about 1 foot (0.3 meter) apart with the center scoring device at the longitudinal center of the conveyor 22. In this manner, the glass sheet is scored with score lines spaced about 1 foot (0.9 meter) apart and about 6 inches (1.27 centimeters) from adjacent side edges as shown in FIG. 2.

The scoring device 28 in our example is used to score glass sheets having a thickness of about ¼ inch (0.64 centimeter). Referring to FIG. 3, the scoring device 28 includes a steel shaft 34 having a diameter of about ¼ inch (0.64 centimeter) and a length of about 3¼ inches (8.2 centimeters) mounted in a female rod end ball joint 36 of the type sold by Superior Ball Joint Company of New Haven, Ind., Catalog No. SPF-Y. End 48 of the shaft is spaced about 1⅛ inches (0.32 centimeter) from the vertical center of the joint 36 as shown in FIG. 3.

A pair of steel collars 93 each about 3/16 inch (0.47 centimeter) thick are secured on the shaft about the joint to limit the downward motion of the shaft to about ¼ inch (0.64 centimeter).

A scoring assembly 50 including a scoring wheel 52 having a scoring angle of 130° and a diameter of about 0.100 inch (0.25 centimeter) is rotatably mounted in a stem 54. The stem 54 is secured to the shaft end 48 by yoke member 56 with the rotating axis of the scoring wheel spaced about 0.45 inch (1.25 centimeters) below the joint 26 as shown in FIG. 3.

The joint 36 is mounted to the bridge 32 by a bolt 40 having a flat head 38 inserted in a T-shaped groove 42 formed in bottom surface 43 of the bridge 32. A nut and lock washer assembly 44 secures the bolt in position to prevent lateral movement thereof in the groove 42. The joint 36 is screwed onto the shaft 46 of the bolt 40 such that the scoring wheel in its initial position lies in the article movement path 26.

A collar assembly 66 is mounted on adjacent end 58 of the shaft 34 on a center-to-center spacing of about 1 inch (2.54 centimeters) between the collar assembly 66 and joint 36. End 64 of helical spring 62 is mounted in the collar assembly as shown in FIG. 3 and the other end of the spring 62 is mounted in eye 70 of eye bolt 72. The spring has an unextended length of about 1 inch (2.54 centimeters) and is made of 1/32 inch diameter (0.08 centimeter) spring wire to apply force of about 4 pounds (1.8 kilograms).

The eye bolt 72 passes through a plate 76 mounted on upper surface 80 of the bridge 32 and held in position by flat head 82 of bolt 84 mounted in groove 86 formed in the upper surface 80 of the bridge 32 and wing nut 88 as shown in FIG. 3.

The bridge 32 is mounted over the conveyor such that the scoring wheel is spaced from a conveyor roll as shown in FIG. 3.

With reference to FIGS. 1 and 2, the glass sheet having a thickness of about ¼ (0.64 centimeter) is advanced along the conveyor 22 at a speed of about 50 feet/minute (1.5 meters per minute). As the leading edge of the sheet engages the scoring wheel 52, the scoring assembly 50 is moved upward against the biasing action of the spring 62 to apply a force to the glass sheet to score same.

The ½ inch (1.27 centimeters) thick glass sheet is scored in our example using scoring device 99 shown in FIG. 7. The scoring device 99 is similar to FIG. 7 with the difference now to be discussed. The joint 36 is mounted on piston 100 of air cylinder 102. The air cylinder 102 is mounted in a C-shaped channel 104 which channel is secured to the bottom bridge surface 43 in a similar manner as the joint 36 was secured thereto. The air cylinder is of the type sold by Cylinders and Valves, Inc. of Cleveland, Ohio, Catalog No. RC2100 and has 1 inch (2.54 centimeters) piston movement. The spring 62 has an unextended length of about 3 inches (7.62 centimeters) and a coil diameter of about ⅞ inch (2.24 centimeters) and is made of ⅛ inch (0.32 centimeter) thick spring wire. The spring applies a force of about 220 pounds (100 kilograms) to the scoring wheel.

The scoring wheel 52 has a scoring angle of about 163° and a diameter of about ½ inch (1.27 centimeters).

In its initial position, the piston is in the air cylinder such that the scoring wheel is spaced above ⅞ inch (2.24 centimeters) from the article movement path.

The glass sheet advances at a speed of about 200 inches per minute (500 centimeters per minute) toward the bridge 32. As the leading edge of the glass is below the scoring wheel, the air cylinder 102 is actuated in any conventional manner to move the piston a distance of about ⅜ inch (0.96 centimeter) out of the air cylinder and move the wheel into engagement with the glass. Continued downward motion of the piston exerts additional force on the spring to score the glass.

After the trailing edge of the glass moves past the scoring wheel, the air cylinder 102 is actuated to withdraw the piston and move the scoring wheel away from the glass to its initial position ready to score the next sheet.

As can now be appreciated, the above examples were presented for illustration purposes and are not limiting to the invention.

What is claimed is:

1. An apparatus for scoring a fracturable material, comprising:
    an elongated member having a first section and a second section;
    a rod end ball joint mounting said member between the first and second sections;
    scoring means mounting the first section of said member; and
    biasing means acting on said elongated member to urge said scoring means under a predetermined scoring force toward the fracturable material to be scored.

2. The apparatus as set forth in claim 1 wherein the fracturable material is selected from the group consisting of glasses, glass-ceramics, ceramics and plastics.

3. The apparatus as set forth in claim 1 wherein said biasing means acts on said member to orient said scoring means in a predetermined position.

4. The apparatus as set forth in claim 1 wherein means act on said member for limiting the motion of said scoring means as it is urged toward the fracturable material to be scored.

5. The apparatus as set forth in claim 1 further including:
    means acting on said rod end ball joint to move said rod end ball joint toward and away from the fracturable material to be scored.

6. The apparatus as set forth in claim 1 further including:
    first means for supporting the fracturable material to be scored;
    second means for supporting said rod end ball joint in facing relationship to said first support means; and
    means for providing relative motion between said first and second support means.

7. The apparatus as set forth in claim 6 wherein said first support means is conveyor means for advancing the fracturable material to be scored along a predetermined path and said second support means is bridge means mounted transverse to the predetermined path.

8. The apparatus as set forth in claim 7 wherein said biasing means mounts the second section of said member to bias said scoring means toward said conveying means.

9. The apparatus as set forth in claim 8 further comprising means for moving said rod end ball joint toward and away from said conveyor means.

10. The apparatus as set forth in claim 1 further including:
    bridge means having a plurality of discrete surfaces;
    means for mounting at least one rod end ball joint and biasing means on at least one of said plurality of discrete surfaces of said bridge means; and
    means mounting said bridge means for positioning said plurality of discrete surfaces in a predetermined position.

11. The apparatus as set forth in claim 10 further including:
    means for displacing the fracturable material relative to said bridge means.

12. The apparatus as set forth in claim 11 wherein said displacing means moves the fracturable material along a predetermined path; said bridge means includes a member having a rectangular cross section mounted transverse to the path.

13. The apparatus as set forth in claim 12 further including means for rotating said bridge means about an axis transverse to the path to position a selected surface of said bridge means in facing relationship to said displacing means.

14. The apparatus as set forth in claim 10 further including means for moving said rod end ball joint toward and away from said displacing means.

15. An apparatus for scoring a fracturable material, comprising:
    an elongated member having a first section and a second section;
    joint means mounting said member between the first and second sections to freely pivot said member along a first reciprocating arcuate path and a second reciprocating arcuate path generally normal to the first reciprocating path;
    scoring means mounting the first section of said member;

biasing means acting on said elongated member to urge said scoring means in a first direction along the first reciprocating arcuate path;

conveyor means for advancing the fracturable material along a predetermined path;

bridge means mounted transverse to the predetermined path for supporting said joint means in facing relationship to said conveyor means; and collar means mounting said member and acting on said joint means to limit the motion of said scoring means toward said conveyor means.

16. An apparatus for scoring a fracturable material, comprising:

means for displacing the fracturable material along a predetermined path;

an elongated member having a first section and a second section;

joint means mounting said member between the first and second sections to freely pivot said member along a first reciprocating arcuate path and a second reciprocating arcuate path generally normal to the first reciprocating path;

scoring means mounting the first section of said elongated member;

biasing means acting on said elongated member to urge said scoring means in a first direction along the first reciprocating arcuate path;

bridge means including a member having a rectangular cross section mounted transverse to the path and having a plurality of discrete surfaces;

means for mounting a plurality of said joint means on each of the surfaces of said bridge means and associated biasing means on opposed surface of said bridge means;

means mounting said bridge means for positioning said plurality of discrete surfaces in a predetermined position; and means acting on said bridge means for securing said bridge means in a selected position such that a selected one of the surfaces of said bridge means faces the path.

* * * * *